(12) United States Patent
Miyazaki

(10) Patent No.: US 11,539,877 B2
(45) Date of Patent: Dec. 27, 2022

(54) APPARATUS AND CONTROL METHOD

(71) Applicant: CANON KABUSHIKI KAISHA, Tokyo (JP)

(72) Inventor: Yasuyoshi Miyazaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/673,549

(22) Filed: Feb. 16, 2022

(65) Prior Publication Data

US 2022/0272273 A1 Aug. 25, 2022

(30) Foreign Application Priority Data

Feb. 25, 2021 (JP) .............................. JP2021-028982

(51) Int. Cl.
*H04N 5/232* (2006.01)

(52) U.S. Cl.
CPC ... *H04N 5/232127* (2018.08); *H04N 5/23267* (2013.01)

(58) Field of Classification Search
CPC ..................... H04N 5/232127; H04N 5/23267
USPC ........................................................ 348/345
See application file for complete search history.

(56) References Cited

U.S. PATENT DOCUMENTS

| | | | |
|---|---|---|---|
| 10,187,583 B2 * | 1/2019 | Kasai .................. | H04N 5/2352 |
| 10,319,097 B2 * | 6/2019 | Kuroda .................. | G06T 7/246 |
| 10,362,207 B2 * | 7/2019 | Miyazaki .......... | H04N 5/232123 |
| 10,908,478 B2 * | 2/2021 | Yoshino .................. | G03B 7/091 |
| 10,911,662 B2 * | 2/2021 | Shin .................... | H04N 5/23293 |
| 11,089,228 B2 * | 8/2021 | Omori .................... | G06V 20/52 |
| 2009/0175500 A1 * | 7/2009 | Kizuki .................... | G06T 7/277 382/103 |
| 2014/0176784 A1 * | 6/2014 | Hongu ............. | H04N 5/232123 348/349 |
| 2016/0173759 A1 * | 6/2016 | Nakamura ....... | H04N 5/232127 348/222.1 |
| 2017/0116749 A1 * | 4/2017 | Kuroda ..................... | G06T 7/20 |
| 2017/0374254 A1 * | 12/2017 | Miyazaki ........... | H04N 5/23254 |
| 2020/0012171 A1 * | 1/2020 | Yoshino ............. | H04N 5/23218 |
| 2020/0137281 A1 * | 4/2020 | Omori .................... | G06V 20/52 |

FOREIGN PATENT DOCUMENTS

JP 2018007272 A 1/2018

* cited by examiner

*Primary Examiner* — Pritham D Prabhakher
(74) *Attorney, Agent, or Firm* — Canon U.S.A., Inc. IP Division

(57) ABSTRACT

An apparatus sets a weighting of a first subject included in a predetermined first range to be larger than that of other subjects when a detected subject is included in a first range in an image, updates a target subject for the photometry of which the weighting is set to be larger after continuing a state where the weighting of the first subject is set to be larger for a predetermined time when the first subject goes out of a second range which is wider than the first range and when the first subject does not go out of a third range which is wider than the second range, and updates the target subject for the photometry of which the weighting is set to be larger in response that the first subject goes out of the third range.

19 Claims, 12 Drawing Sheets

FIG. 5A BLOCK INTEGRATION
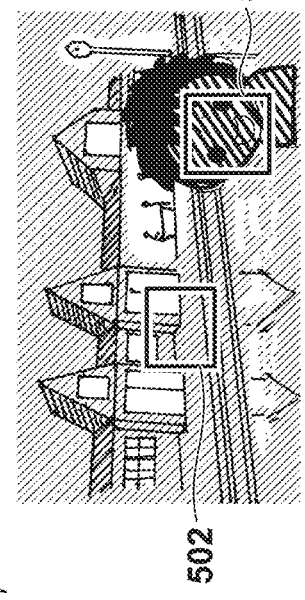
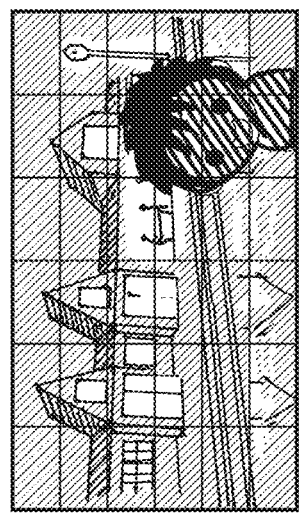
FIG. 5B BRIGHTNESS OF FOCUS DETECTION AREA (FIXED FRAME)
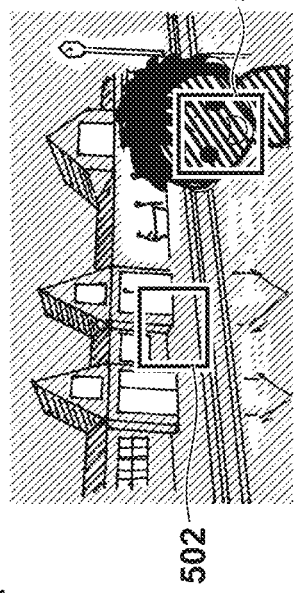
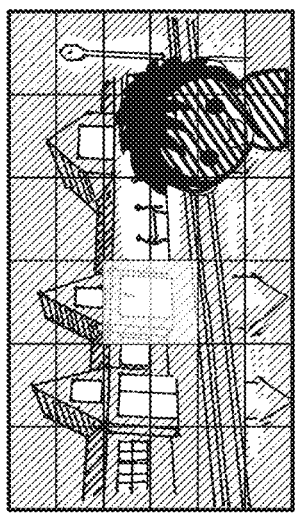
FIG. 5C BRIGHTNESS OF SUBJECT AREA (TRACKING FRAME)
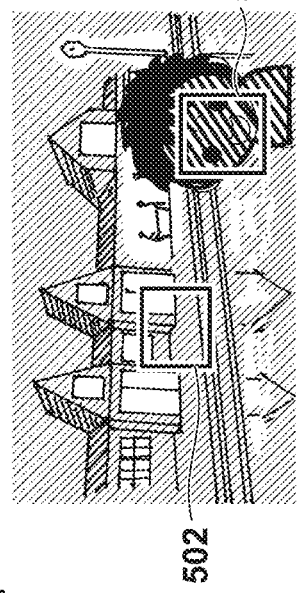
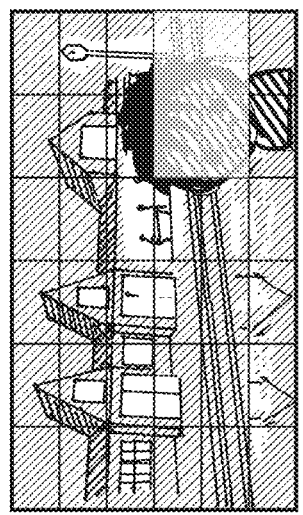

FIXED FRAME: ENABLED
TRACKING FRAME: DISABLED

FIXED FRAME: DISABLED
TRACKING FRAME: ENABLED

FIXED FRAME: DISABLED
TRACKING FRAME:
ENABLED STATE CONTINUED

FIXED FRAME: DISABLED
TRACKING FRAME:
ENABLED STATE CONTINUED FOR
PREDETERMINED TIME PERIOD

FIXED FRAME: ENABLED
TRACKING FRAME: DISABLED

SHORT FOCAL LENGTH

LONG FOCAL LENGTH

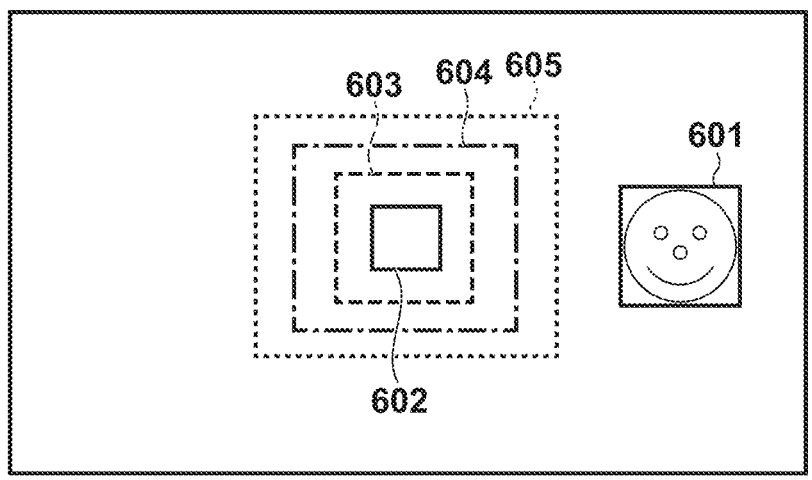
FIG. 10A  LOW SUBJECT SPEED
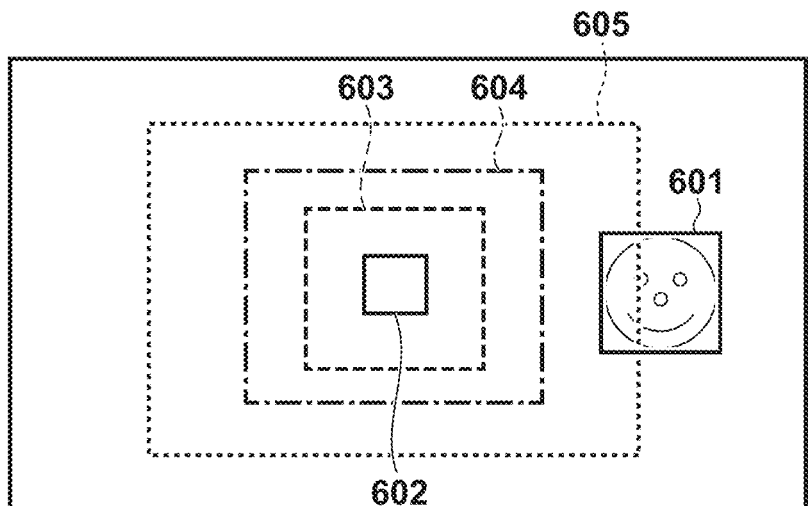
FIG. 10B  HIGH SUBJECT SPEED
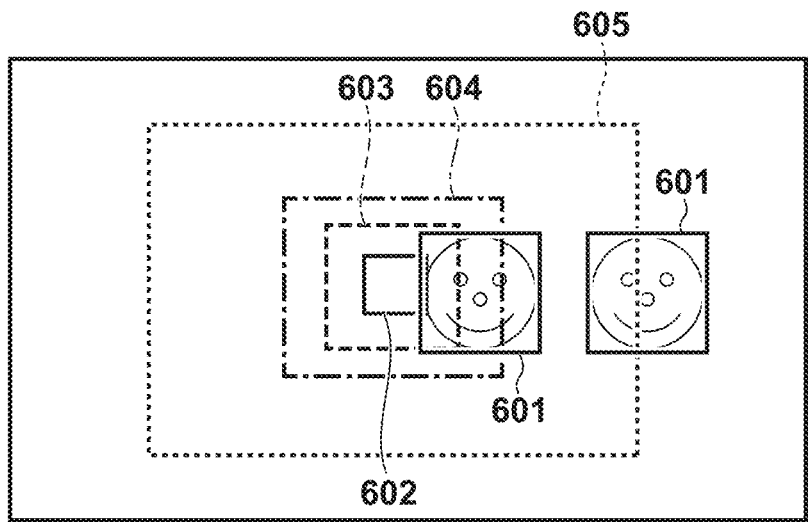
FIG. 10C  HIGH SUBJECT SPEED & PLURAL SUBJECTS

HUMAN

ANIMAL

ANIMAL FLYING/RUNNING

APPARATUS AND CONTROL METHOD

BACKGROUND

Field of the Disclosure

The aspect of the embodiments relates to a technique for determining a subject to be shot.

Description of the Related Art

Conventionally, a first method (FIG. 3A) in which a preset focus detection frame (fixed frame) is displayed on a screen for displaying a captured image such as a live view, and a user performs shooting (AF processing or AE processing) by aligning a subject with a fixed frame, and a second method (FIG. 3B) in which shooting is performed by automatically aligning a frame with a main subject (face, etc.) in the screen, are known.

When shooting is performed by the first method, the user can easily adjust a stationary subject to the fixed frame, but when a movement of the subject is fast, it is difficult to align the fixed frame therewith. In contrast, when the user performs shooting of a subject of which the movement is fast, a tracking function that automatically aligns the frame (tracking frame) to the main subject by the second method is effective, but depending on a situation of the subject, the tracking frame may not align with a desired subject. For example, when there is a plurality of subjects in the screen, even though the user wants to shoot the subject near the center of the screen, if the entire screen is set as a detection target, the subject at the end of the screen may be selected as the main subject.

For such issues, Japanese Patent Laid Open No. 2018-7272 describes a method of setting a first area and a second area around a reference point of the captured image in the screen, where even when the main subject moves outside the first area, when the main subject falls inside the second area, the main subject is maintained as a tracking target, and a tracking target is newly selected from the subjects included in the first area when a predetermined time period has elapsed after the main subject moves outside the second area.

In Japanese Patent Laid Open No. 2018-7272, although the size of the second area is variable, depending on a moving mode and a moving speed of the subject, the main subject of the tracking target may move outside the second area, the user may not be able to shoot the subject aimed at by the user, or a fluctuation (flicker) of exposure may occur due to the tracking target being changed.

SUMMARY OF THE DISCLOSURE

The aspect of the embodiments provides an apparatus comprising: a capturing unit configured to capture an image of a subject formed through an optical system and output an image; and at least one processor and a memory coupled to the processor storing instructions that when executed by the processor, cause the processor to function as: a photometry unit configured to perform a photometry for a target subject; a detection unit configured to detect a subject included in the output from the capturing unit; a setting unit configured to set a degree of weighting for the target subject for which the photometry is performed by the photometry unit; and a control unit configured to control an exposure based on a photometric result of the photometry unit, wherein the setting unit sets the weighting of a first subject included in a predetermined first range to be larger than that of other subjects when the detected subject is included in the first range in the image, updates the target subject for the photometry of which the weighting is set to be larger after continuing a state where the weighting of the first subject is set to be larger for a predetermined time when the first subject goes out of a second range which is wider than the first range and when the first subject does not go out of a third range which is wider than the second range, and updates the target subject for the photometry of which the weighting is set to be larger in response to the first subject going out of the third range.

The aspect of the embodiments provides a method of controlling an apparatus comprising: capturing an image of a subject formed through an optical system and outputting an image; detecting a subject included in the image; setting a degree of weighting for a target subject for a photometry; performing the photometry for the target subject; and controlling an exposure based on a photometric result of the photometry, wherein in the setting, when the detected subject is included in a predetermined first range in the image, the weighting of a first subject included in the first range is set to be larger than that of other subjects, when the first subject goes out of a second range which is wider than the first range and when the first subject does not go out of a third range which is wider than the second range, the target subject for the photometry for which the weighting is set to be larger is updated after continuing a state in which the weighting of the first subject is set to be larger for a predetermined time, and the target subject for which the weighting is set to be larger is updated in response to the first subject going out of the third range.

The aspect of the embodiments provides a non-transitory computer-readable storage medium storing a program that causes a computer to execute a method of controlling an apparatus comprising: capturing an image of a subject formed through an optical system and outputting an image; detecting a subject included in the image; setting a degree of weighting for a target subject for a photometry; performing the photometry for the target subject; and controlling an exposure based on a photometric result of the photometry, wherein in the setting, when the detected subject is included in a predetermined first range in the image, the weighting of a first subject included in the first range is set to be larger than that of other subjects, when the first subject goes out of a second range which is wider than the first range and when the first subject does not go out of a third range which is wider than the second range, the target subject for the photometry for which the weighting is set to be larger is updated after continuing a state in which the weighting of the first subject is set to be larger for a predetermined time, and the target subject for which the weighting is set to be larger is updated in response to the first subject going out of the third range.

Further features of the disclosure will become apparent from the following description of exemplary embodiments (with reference to the attached drawings).

BRIEF DESCRIPTION OF THE DRAWINGS

FIGS. 5A-5C are diagrams illustrating a photometric value acquisition method for a subject area and a focus detection area according to the present embodiment.

FIGS. 10A-10C are diagrams illustrating examples of changing the enablement determination conditions according to subject speeds according to the present embodiment.

DESCRIPTION OF THE EMBODIMENTS

Figure 1:
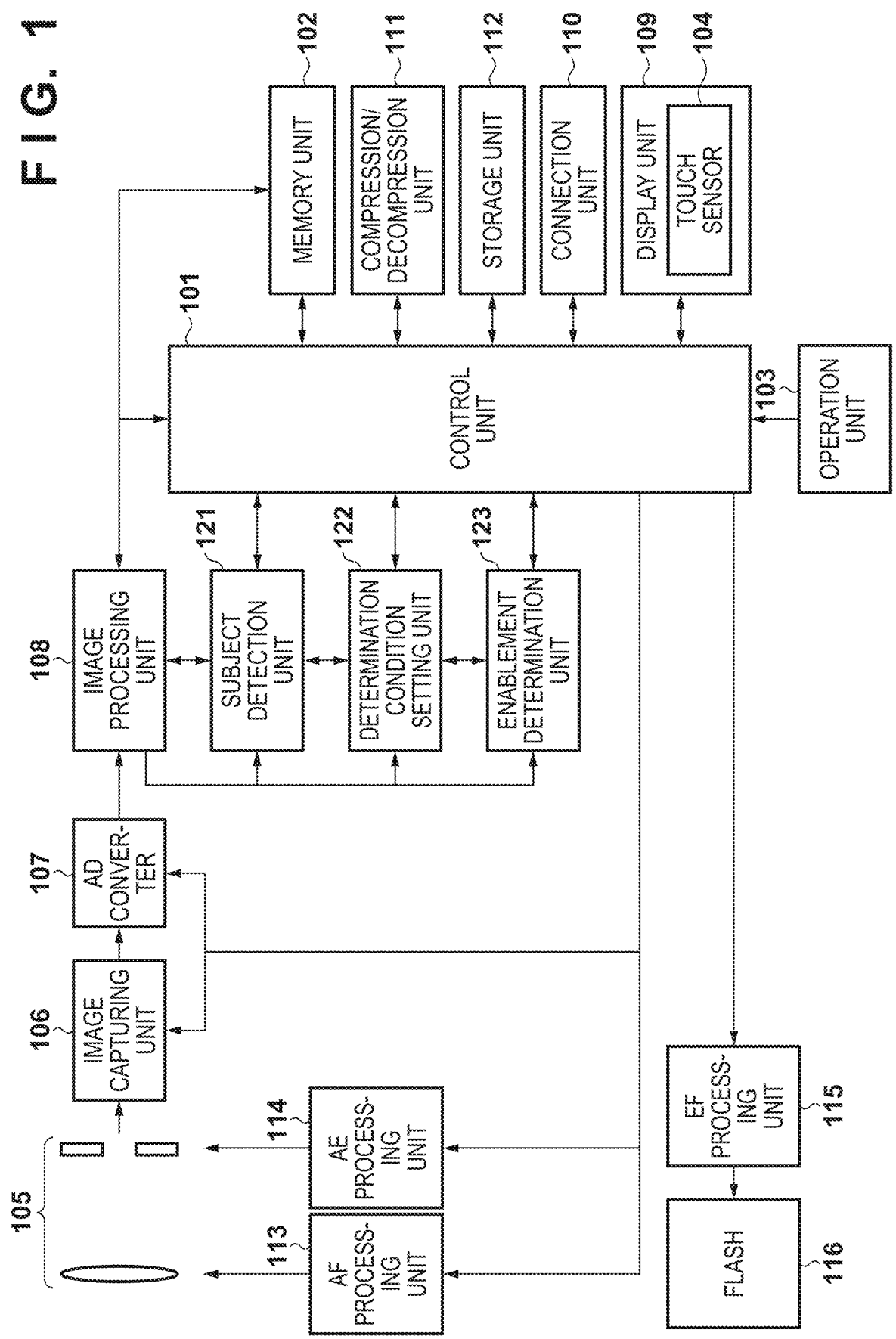
FIG. 1 is a block diagram illustrating an apparatus configuration according to a present embodiment.

Hereinafter, embodiments will be described in detail with reference to the attached drawings. Note, the following embodiments are not intended to limit the scope of the disclosure. Multiple features are described in the embodiments, but limitation is not made a disclosure that requires all such features, and multiple such features may be combined as appropriate. Furthermore, in the attached drawings, the same reference numerals are given to the same or similar configurations, and redundant description thereof is omitted.

[Outline Description]

First, an outline of the present embodiment will be described with reference to FIG. 4.

Figure 4A:
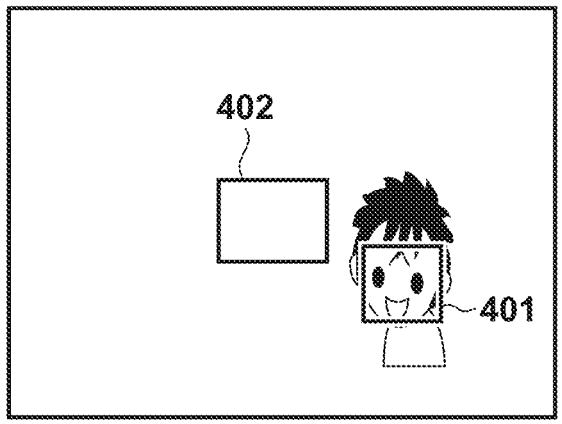
FIGS. 4A-4D are diagrams illustrating positional relationships between a focus detection frame and a subject according to the present embodiment.

In the present embodiment, as shown in FIG. 4A, a subject frame (tracking frame) 401 indicating a main subject and a preset focus detection frame (fixed frame) 402 can be simultaneously displayed on a screen for displaying a captured image. Then, a predetermined margin range 403 is set to the fixed frame 402 as shown in FIGS. 4B-4D; in accordance with a positional relationship between a main subject of a tracking target (tracking frame 401) and the fixed frame 402 and the predetermined margin range 403, it is determined whether the main subject on which the tracking frame 401 is added is set as the detection target or the subject existing in the fixed frame 402 is set as the detection target; thereby the user can shoot the subject aimed at by the user and the flicker of the exposure can be reduced.

FIG. 4A illustrates an example of a screen for displaying a live view which can be viewed by the user, and reference numeral 401 denotes the tracking frame and reference numeral 402 denotes the fixed frame. When the tracking frame 401 and the fixed frame 402 are displayed simultaneously as shown in FIG. 4A, in a state where the subject is not detected, the subject inside the fixed frame 402 is enabled/activated as the detection target for performing shooting (AF processing or AE processing).

Figure 4B:
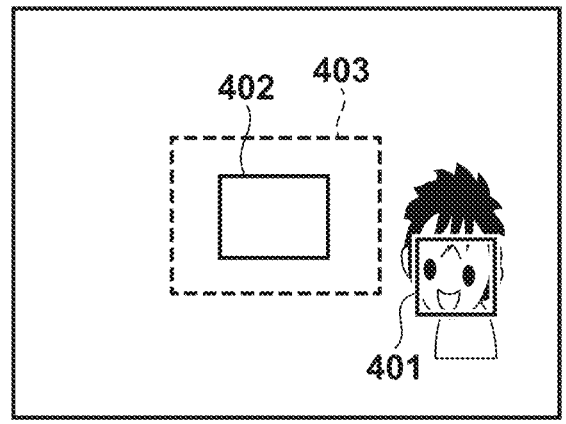
Figure 4C:
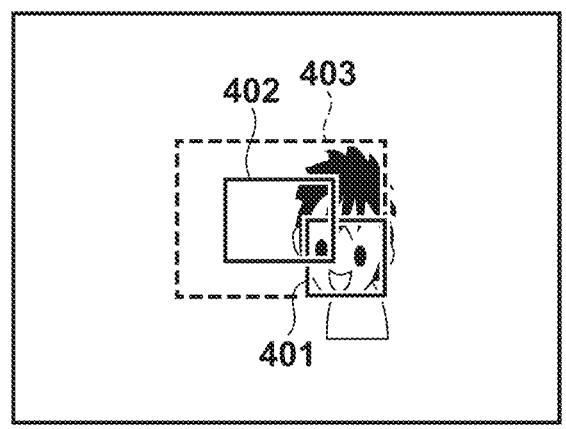
Figure 4D:
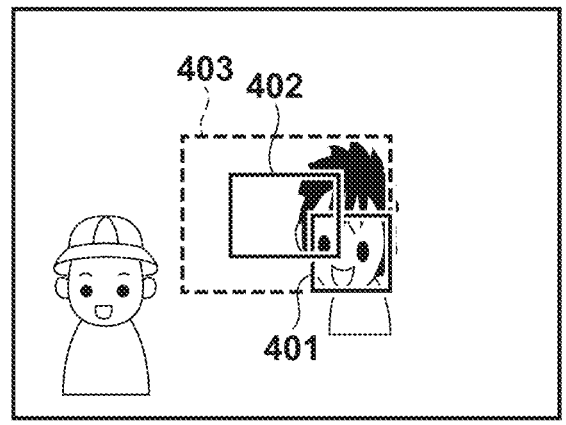

Further, as shown in FIGS. 4B-4D, a predetermined margin range 403 which is enlarged with reference to the fixed frame 402 is set; the size of the predetermined margin range 403 is appropriately set in accordance with a lens type, a movement and a type of the subject, a shooting mode or the like. Note that the tracking frame 401, the fixed frame 402 and the margin range 403 are displayed in a display appearance such that they can be identified on an image by making the types and colors of lines different from each other.

In this way, even when the main subject (tracking frame 401) as shown in FIG. 4C moves outside the fixed frame 402 but when the center of the subject falls inside the predetermined margin range 403, the main subject is maintained as the detection target (enabled/activated), and the fixed frame 402 is disabled/deactivated. Further, when the center of the subject as shown in FIG. 4B moves outside the predetermined margin range 403, the subject is disabled/deactivated as the detection target, and the fixed frame 402 is enabled. Thus, even when the movement of the subject aimed at by the user in the fixed frame 402 is large and the center of the subject slightly deviates from the fixed frame 402, the subject aimed at by the user is not disabled/deactivated as the detection target. Further, as shown in FIG. 4D, even when a plurality of subjects are included in the image, by setting the predetermined margin range 403 with reference to the fixed frame 402, the user can shoot the subject aimed at by the user as the main subject and the flicker of the exposure can be reduced.

First Embodiment

Hereinafter, an embodiment in which the image capture apparatus of the disclosure is applied to a digital camera will be described in detail with reference to the accompanying drawings.

Note that the image capture apparatus of the disclosure is not limited to the digital camera, and can be applied to any apparatus having an Automatic Exposure (AE) function, an Automatic Focus Adjustment (AF) function, and a subject detection function (tracking function) such as a smart phone which is a type of a mobile phone or a tablet device.

<Apparatus Configuration>

First, configuration and function of the digital camera (hereinafter, camera) according to the present embodiment will be described with reference to FIG. 1.

FIG. 1 is a block diagram illustrating components of a camera 100 according to the present embodiment.

A control unit 101 is an arithmetic processing unit such as a CPU or an MPU that controls the entire camera 100. The control unit 101 executes programs loaded into a memory unit 102; thereby processing of flowcharts to be described later is implemented.

The memory unit 102 includes a volatile memory such as a RAM, and is used as a working memory for storing image data output from an image processing unit 108, which will be described later, and for loading constants, variables, computer programs for operations of the control unit 101, and the like.

An operation unit 103 includes switches, buttons, dials, or the like that accept user operations such as a power on/off, a shooting preparation instruction, a shooting instruction, a menu screen display instruction, and an operation mode change instruction. The operation unit 103 includes a touch sensor 104 capable of detecting a touch operation on a display unit 109, which will be described later. Operation modes of the camera 100 can be switched to, for example, a still image shooting mode, a moving image recording mode, or a reproduction mode.

An image capturing unit 106 includes an image sensor configured with a photoelectric conversion element such as a CCD or a CMOS that converts, into an electrical signal, an optical image of a subject formed by an image capturing optical system 105 including a lens, an aperture, a shutter, and a mechanical unit that drives them. The image capturing unit 106 outputs an analog image signal generated by capturing the optical image of the subject to an A/D converter 107.

The A/D converter 107 converts the analog image signal output from the image capturing unit 106 into digital signal. In the present embodiment, a configuration for adjusting an exposure time of the image capturing unit 106 by the shutter is used, but is not limited thereto; for example, a configuration may be such that the image capturing unit 106 has an electronic shutter function, and the exposure time is adjusted by a control signal.

The image processing unit 108 performs resizing processing and color conversion processing such as predetermined pixel interpolation and reduction for data output from the A/D converter 107. Further, the image processing unit 108 performs predetermined arithmetic processing using the captured image data, and the control unit 101 performs Auto Focus (AF) processing, Auto Exposure (AE) processing, flash pre-emission (EF) processing and Auto White Balance (AWB) processing, based on the arithmetic result.

The display unit 109 includes a Liquid Crystal Display (LCD), an organic Electro Luminescence (EL), or the like, and displays a shooting state, shot images, various settings, operation modes, and/or the like of the camera 100. The display unit 109 is provided with the touch sensor 104. The touch sensor 104 is capable of detecting a contact (touch operation) with a display surface of the display unit 109 (touch operation surface of the touch sensor 104).

A connection unit 110 is an interface connector for connecting an external device such as an external monitor or an external storage to a camera body to transmit and receive images and sounds. A screen of the display unit 109 can be displayed on the external monitor by connecting the camera body to the external monitor by the connection unit 110. In addition, by connecting the camera body to the external storage by the connection unit 110, the image data shot by the camera can be stored in the external storage. The connection unit 110 is, for example, an analog output terminal such as a composite terminal, S-video terminal, D terminal, component terminal and analog RGB terminal, or a digital output terminal such as a DVI terminal and HDMI® terminal.

A compression/decompression unit 111 performs processing of compressing and encoding the image data output from the image processing unit 108 and stored in the memory unit 102 in a predetermined format (e.g. JPEG) and storing the image data in a storage unit 112, and processing of reading the encoded image file from the storage unit 112 and decoding the image signal.

The storage unit 112 is a nonvolatile memory such as a ROM, a memory card or a hard disk. The storage unit 112 stores image files, constants for the operations of the control unit 101, computer programs, and/or the like.

An AF processing unit 113 performs AF processing in which the control unit 101 adjusts focus by displacing a position of a focus lens of the image capturing optical system 105 based on a result (phase difference or contrast) of the AF arithmetic processing performed using the image data generated by the image processing unit 108. In the present embodiment, there are cases where, in accordance with an enablement determination processing result which will be described later, the AF processing is performed on the subject of any position such as a center in the image (fixed frame), or the AF processing is performed on the subject of the tracking target such as a human face or an animal (tracking frame).

An AE processing unit 114 performs AE processing in which the control unit 101 adjusts a brightness by changing an aperture diameter of the image capturing optical system 105 based on a photometric result (difference from a proper brightness) by AE arithmetic processing (photometry/brightness metering) performed using the image data generated by the image processing unit 108. Note that in the AE processing of the present embodiment, the control unit 101 performs the AE arithmetic processing using photometric information obtained from the entire image and the photometric information obtained from the main subject (in the fixed frame or the tracking frame) on which the AF processing unit 113 performs the AF processing.

The AE arithmetic processing result $\Delta BV$ is obtained from the following formulas.

$$\Delta BV = \text{Photometric value of the entire image} + \text{Photometric value of the main subject} + \text{Various correction values}$$

An EF processing unit 115 performs flash pre-emission (EF) processing for irradiating auxiliary light to the subject by emitting a flash 116 when the brightness in shooting is not appropriate. A subject detection unit 121 performs subject detection processing for detecting a type, a portion, a state (class), a position and a size (area) of the subject, and/or the like using the image data generated by the image processing unit 108. Further, the subject detection unit 121 has a subject tracking function that displays the tracking frame on the main subject by setting the main subject determined automatically or by the user operation as the tracking target from one or more subjects detected in the image.

A determination condition setting unit 122 sets the fixed frame and the enablement determination condition (margin range) displayed together with the tracking frame in the screen of the display unit 109 in a live view mode of displaying the image (live view image) captured by the image capturing unit 106 in real time. The fixed frame is fixedly displayed at the center of the screen of the display unit 109, and its position and size can be set by the user operation. A subject within the fixed frame to be described later or within the margin range satisfying the enablement determination condition is a target for the AE processing.

An enablement determination unit 123 performs enablement determination processing which will be described later, based on the tracking frame of the main subject determined by the subject detection unit 121, the fixed frame set by the determination condition setting unit 122, and the enablement determination condition (margin range).

<Shooting Operation>

Next, operations in shooting by the camera 100 according to the present embodiment will be described.

First, when the user turns on a power switch included in the operation unit 103 of the camera 100, a power-on operation is notified from the operation unit 103 to the control unit 101, and the control unit 101 supplies necessary power to each component of the camera 100.

When the power is supplied to each component of the camera 100, the shutter included in the image capturing optical system 105 is opened, and the subject image light incident through the image capturing optical system 105 is formed on an image capturing surface of the image capturing unit 106. The image capturing unit 106 reads electric charge accumulated in the image sensor, and outputs it as an analog image signal to the A/D converter 107.

The A/D converter 107 performs sampling and gain adjustment on the analog image signal output from the image capturing unit 106, converts the analog image signal into a digital image signal, and outputs the digital image signal to the image processing unit 108.

The image processing unit 108 performs various image processing on the digital image signal output from the A/D converter 107 to generate image data, stores the image data in the memory unit 102, and outputs the image data to the control unit 101, the subject detection unit 121, the determination condition setting unit 122, and the enablement determination unit 123.

The subject detection unit 121 performs subject detection processing using the image data generated by the image processing unit 108 and acquires information of the main subject. In the present embodiment, information of the main subject is, for example, information of a face area occupied in the image obtained from center coordinates and a size of a human face. Information obtained by a human body/torso detection, an animal detection, or the like may be used instead of the information of the face area as long as information can specify the subject area.

The AE processing and the AF processing of the present embodiment set, as the detection target, the subject within the preset fixed frame by the user or the subject within the margin range satisfying the enablement determination condition set by the determination condition setting unit 122.

The control unit 101 performs the AF processing by the AF processing unit 113 and performs the AE processing by the AE processing unit 114 using the information regarding the subject area obtained by the subject detection unit 121, and the information regarding the fixed frame and an enablement determination condition obtained by the determination condition setting unit 122. The enablement determination condition will be described later.

By a shutter button included in the operation unit 103 of the camera 100 being pressed halfway, a shooting preparation instruction from the operation unit 103 (shutter switch signal SW1 on) is input in the control unit 101. The control unit 101 performs the AF processing and the AE processing using the image data at the time of receiving the shooting preparation instruction, and acquires an appropriate focus and exposure condition for shooting.

By the shutter button included in the operation unit 103 of the camera 100 being fully pressed, a shooting instruction from the operation unit 103 (shutter switch signal SW2 on) is input in the control unit 101. Upon receiving the shooting instruction, the control unit 101 starts a series of shooting processing (image recording processing) from reading the signal from the image capturing unit 106 to writing the captured image as an image file in the storage unit 112. In the image recording processing, the control unit 101 detects a current brightness value using the image data output from the image processing unit 108, and causes the EF processing unit 115 to emit the flash 116 when the control unit 101 determines that the brightness is darker than a predetermined threshold.

<Processing Flow>

Next, operations in shooting by the camera 100 according to the present embodiment will be described with reference to FIG. 2.

Figure 2:
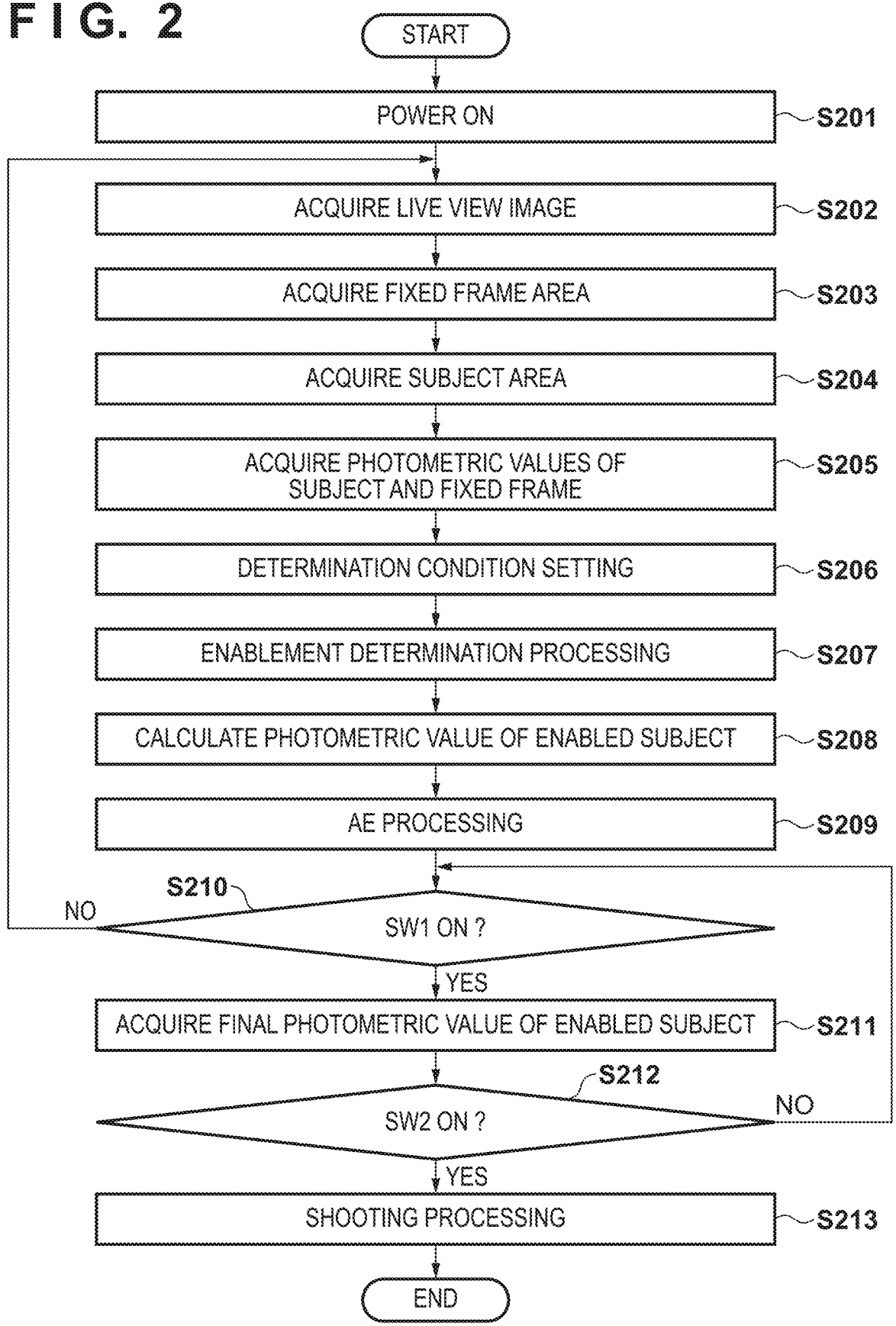
FIG. 2 is a flowchart illustrating an operation in shooting according to the present embodiment.
Figure 3A:
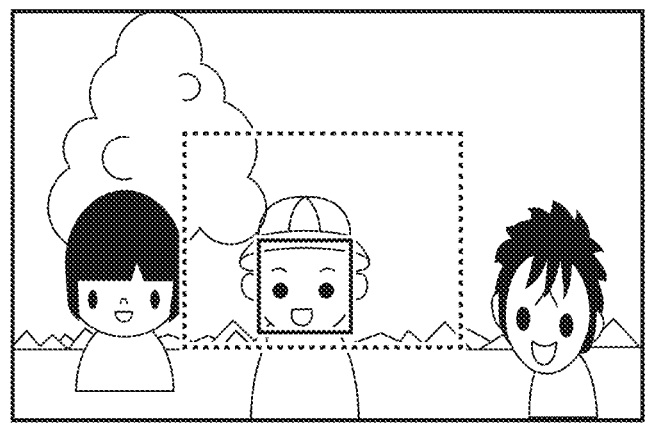
FIGS. 3A and 3B are diagrams illustrating conventional positional relationships between a focus detection frame and a subject.
Figure 3B:
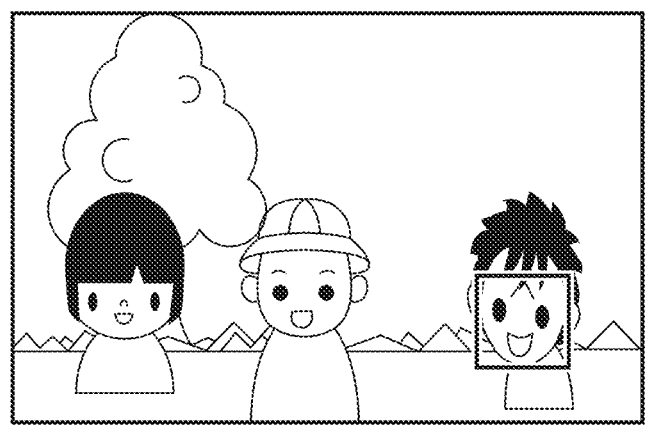

FIG. 2 is a flowchart illustrating the operations in shooting by the camera 100 according to the present embodiment. The processing of FIG. 2 is implemented by the control unit 101 which loads the programs stored in the storage unit 112 into the memory unit 102, executes the programs, and controls each component of the camera 100.

In step S201, the control unit 101 supplies power to each component of the camera 100 in response to the power being turned on.

In step S202, the control unit 101 acquires a live view image captured by the image capturing unit 106.

In step S203, the control unit 101 acquires information about the positions and sizes of the fixed frame and the margin range displayed on the live view image. In the present embodiment, it is assumed that the fixed frame is one frame arbitrarily set by the user operation.

In step S204, the control unit 101 acquires the subject area using the live view image acquired in step S202 by the subject detection unit 121. Although the face detection is used in the present embodiment, the torso detection, the animal detection, or the like may be used.

In step S205, the control unit 101 acquires the photometric values of the respective areas of the subject and the fixed frame obtained in steps S203 and S204. The photometric values are calculated by dividing the entire image into a plurality of blocks as shown in FIG. 5A and using an arithmetic mean of Y values for each block. The photometric value of the focus detection area (fixed frame) 502 is assumed to be an average brightness of the shaded portion shown in FIG. 5B. The brightness of the subject area (tracking frame) 501 is calculated by the average brightness of the area where the subject area obtained by the subject detection corresponds to a block integration area (shaded portion in FIG. 5C).

In steps S206 and S207, the control unit 101 sets a parameter of the enablement determination condition in the enablement determination processing, and executes the enablement determination processing. Details of the enablement determination processing will be described later.

In step S208, the control unit 101 acquires the photometric value calculated from the subject which is enabled by the enablement determination processing.

In step S209, the control unit 101 executes the AE processing by the AE processing unit 114 using the photometric value obtained in step S208, and acquires the live view image captured by the image capturing unit 106.

In step S210, the control unit 101 determines whether the shutter switch signal SW1 is turned on. The control unit 101 returns the processing to step S202 when the control unit 101 determines that the shutter switch signal SW1 is not turned on, that is, the control unit 101 repeats the processing of steps S202 to S209 until the shutter switch signal SW1 is turned on. Further, the control unit 101 advances the processing to step S211 when the control unit 101 determines that the shutter switch signal SW1 is turned on.

In step S211, the control unit 101 acquires the photometric value obtained in step S208 as the final photometric value.

In step S212, the control unit 101 determines whether the shutter switch signal SW2 is turned on. The control unit 101 returns the processing to step S210 when the control unit 101 determines that the shutter switch signal SW2 is not turned on. Further, the control unit 101 advances the processing to step S213 when the control unit 101 determines that the shutter switch signal SW2 is turned on.

In step S213, the control unit 101 performs the series of shooting processing (image recording processing) from reading the signal from the image capturing unit 106 to writing the captured image to the storage unit 112 as the image file in the storage unit 112.

<Enablement Determination Processing>

Next, the enablement determination processing in step S207 of FIG. 2 will be described with reference to FIGS. 6 to 13D.

The enablement determination processing of the present embodiment is processing of determining which subject within the fixed frame or within the tracking frame is enabled as the detection object (photometric target) of the photometric value when the fixed frame and the tracking frame are simultaneously displayed on the screen for displaying the captured image.

FIGS. 6A-6E illustrates examples of the fixed frame, the margin range and the subject (tracking frame) displayed on the screen for displaying the captured image in the enablement determination processing according to the present embodiment.

In FIGS. 6A-6E, areas 601 indicate the tracking frames of the main subject, and areas 602 indicate fixed frames. The position and size of the tracking frame 601 is set and displayed in accordance with the position and size of the main subject (human face). The position and size of the fixed frame 602 is set in accordance with the user operation (step S206 in FIG. 2).

The rectangular areas 603 to 605 are set in accordance with parameters of the enablement determination condition with reference to the fixed frames 602 (step S206 in FIG. 2), and are margin ranges used in the enablement determination processing (step S207 in FIG. 2). It has a relation that the size of the area 603 is smaller than the size of the area 604, and the size of the area 604 is smaller than the size of the area 605 (area 603<area 604<area 605); they are obtained by the following formulas.

Size of area603=size of fixed frame*$p$+size of tracking frame*$q$+size of screen*$r$ Size of area604=size of fixed frame*$s$+size of tracking frame*size of $t$+size of screen*$u$ Size of area605=size of fixed frame*$v$+size of tracking frame*$w$+size of screen*$x$ The above formulas are examples, and other formulas may be used. Note that the parameters p, q, r, s, t, u, v, w and x of the above formulas are the enablement determination conditions for setting a degree of weighting of the subject as the detection target for performing the photometry in the AE processing, and are, for example, the following values.
p=0.3, q=0.3, r=0
s=0.3, t=0.3, u=0.05
v=0.3, w=0.3, x=0.1

Note that the tracking frame 601, the fixed frame 602 and the areas 603 to 605 are displayed in a display appearance such that they can be identified on the screen for displaying the captured image by making types and colors of lines different from each other.

In the enablement determination processing of the present embodiment, when the center of the subject is in the center side of the fixed frame 602 than the boundary line of the area 603, the main subject (tracking frame) is enabled as the detection target for the photometry and the fixed frame is disabled. The area 604 is the margin range for determining whether the subject that has been once enabled in the area 603 is enabled or disabled, and is disabled when the center of the subject enabled in the area 603 goes out of a rectangle boundary of the area 604. The area 605 is the margin range for continuing the enabled state of the subject of the tracking target for a predetermined time period, and the enabled state of the subject of the tracking target is continued for the predetermined time period even when the center of the subject which has been once enabled in the area 603 goes out of the area 604, when the center of the subject does not go out of the boundary of the area 605, and the subject of the tracking target is disabled after the predetermined time period has elapsed in that state. When the center of the subject, which has been once enabled in the area 603, goes out of the area 604 and also goes out of the area 605, the subject is disabled without waiting for the predetermined time period.

FIGS. 6A-6E illustrate examples of transitions of the fixed frames 602 on the screen for displaying the captured image and the tracking frames 601 with respect to the margin ranges 603 to 605, and examples of changes of states from when the main subject (human face) indicated by the tracking frame 601 enters from the outside of the area 605 into the area 604 and is enabled until it gets out of the area 605 and is disabled.

Figure 6A:
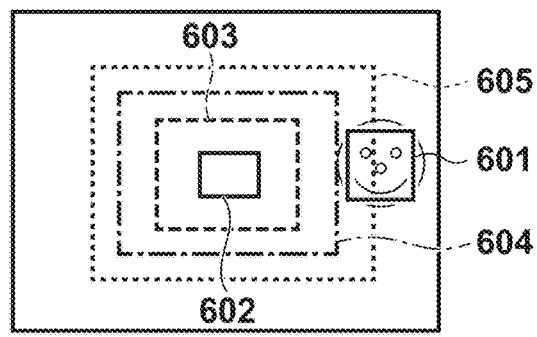
FIGS. 6A-6E are diagrams illustrating enablement determination processing according to the positional relationships between a fixed frame and a margin range and a tracking frame according to the present embodiment.
Figure 6B:
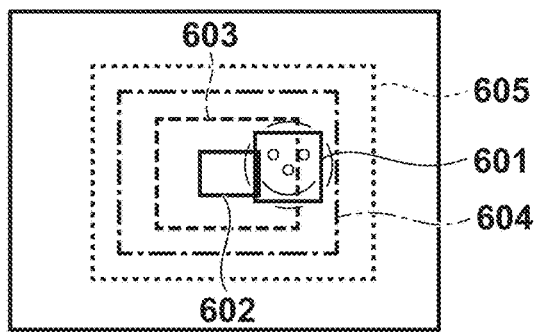
Figure 6C:
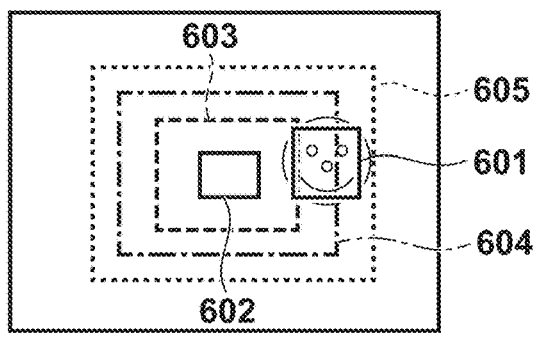
Figure 6D:
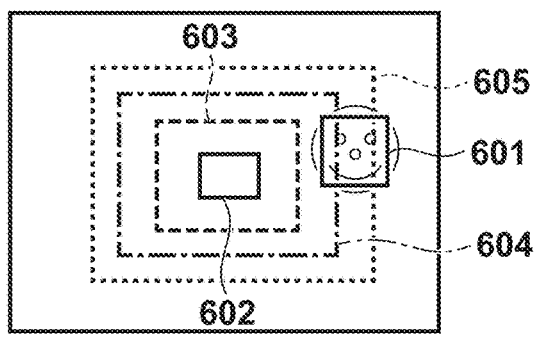
Figure 6E:
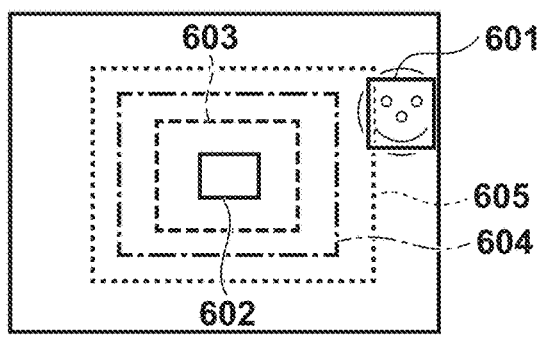

In FIG. 6A, since the tracking frame (center of subject) 601 is outside the area 605, the subject of the tracking target is disabled, and the fixed frame 602 is enabled. In FIG. 6B, since the tracking frame (center of subject) 601 falls inside the boundary of the area 603, the subject of the tracking target is enabled, and the fixed frame 602 is disabled. In FIG. 6C, after the subject of the tracking target is enabled in FIG. 6B, since the tracking frame (center of subject) 601 is outside the boundary of the area 603 but falls inside the boundary of the area 604, the enabled state of the subject of the tracking target is continued, and the disabled state of the fixed frame 602 is continued. In FIG. 6D, since the subject of the tracking target is outside the boundary of the area 604 but falls inside the boundary of the area 605, the enabled state of the subject of the tracking target is continued for the predetermined time period (the fixed frame 602 is disabled), the subject of the tracking target is disabled after the predetermined time has elapsed, and the fixed frame 602 is enabled. In FIG. 6E, since the subject of the tracking target is outside the boundary of the area 605, the subject of the tracking target is disabled, and the fixed frame 602 is enabled.

Figure 7:
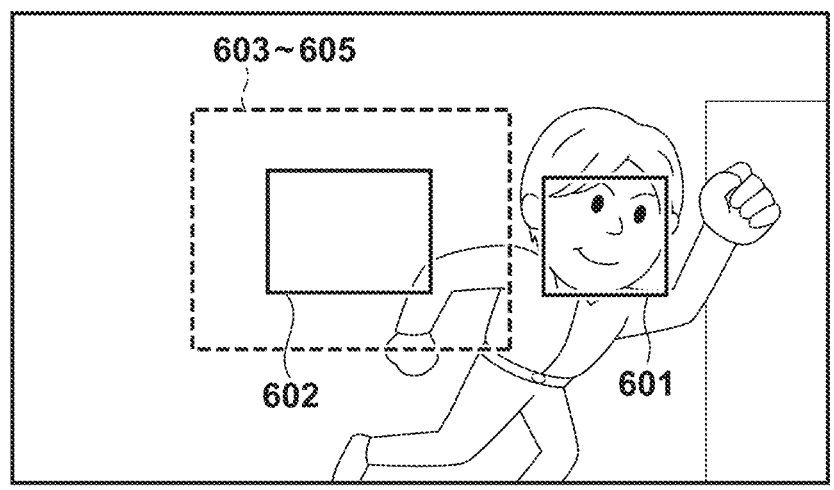
FIG. 7 is a diagram illustrating a reason for changing an enablement determination condition according to the present embodiment.
Figure 8A:
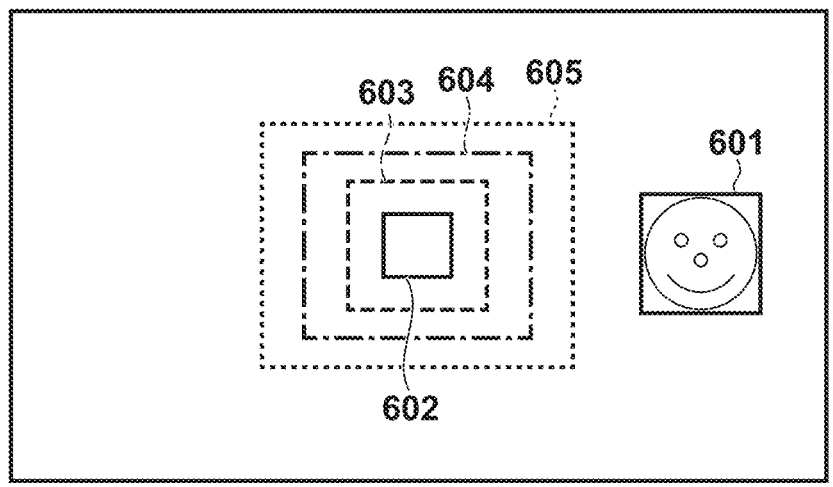
FIGS. 8A and 8B are diagrams illustrating examples of changing the enablement determination conditions according to a focal length of a lens according to the present embodiment.
Figure 8B:
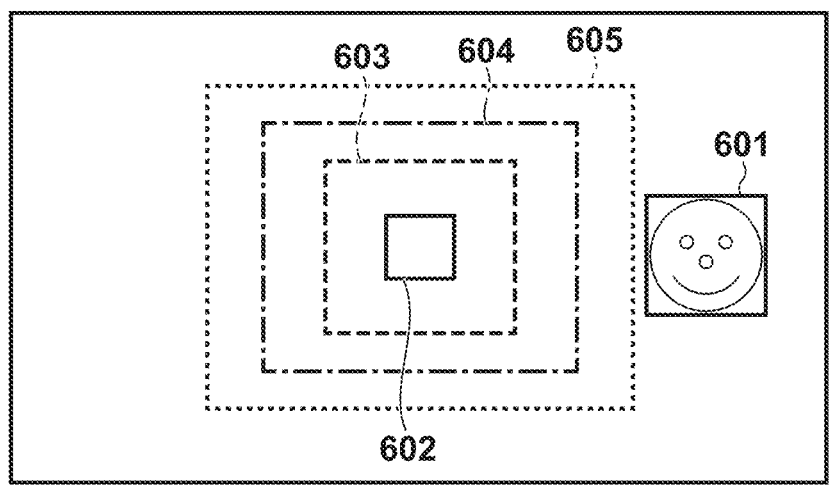
Figure 9A:
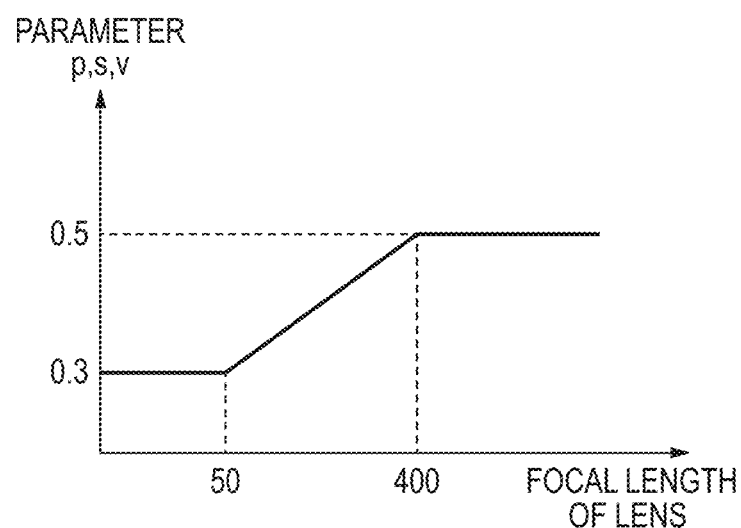
FIGS. 9A-9C are diagrams illustrating relationships between the focal length of the lens and the enablement determination condition according to the present embodiment.
Figure 9B:
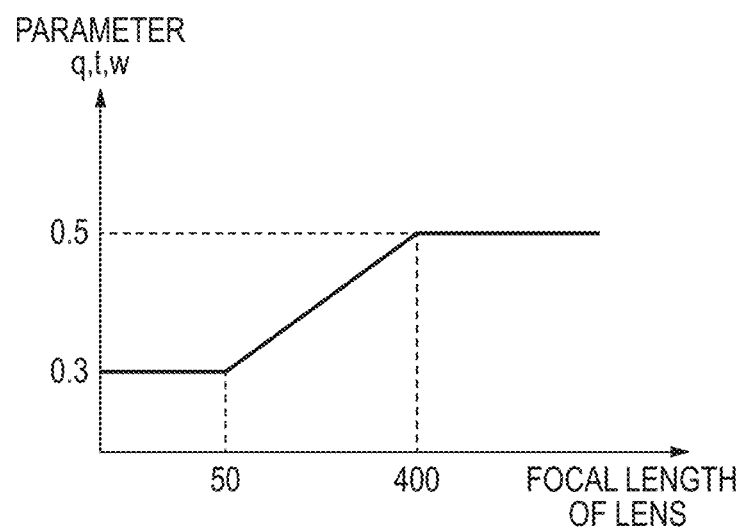
Figure 9C:
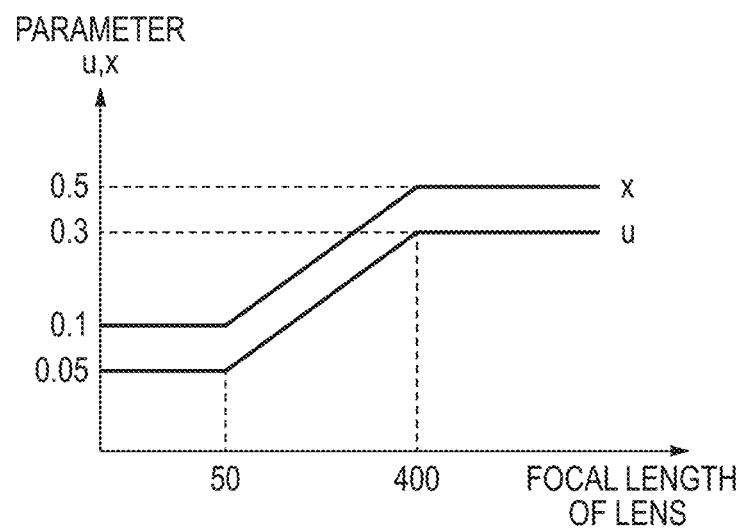
Figure 11A:
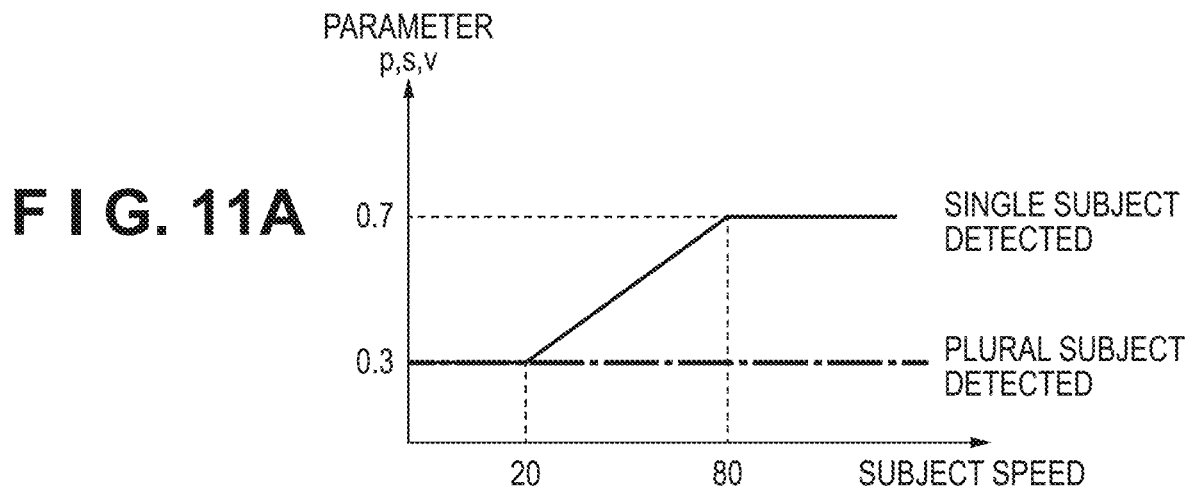
FIGS. 11A-11C are diagrams illustrating examples of relationships between the subject speed and the enablement determination condition according to the present embodiment.
Figure 11B:
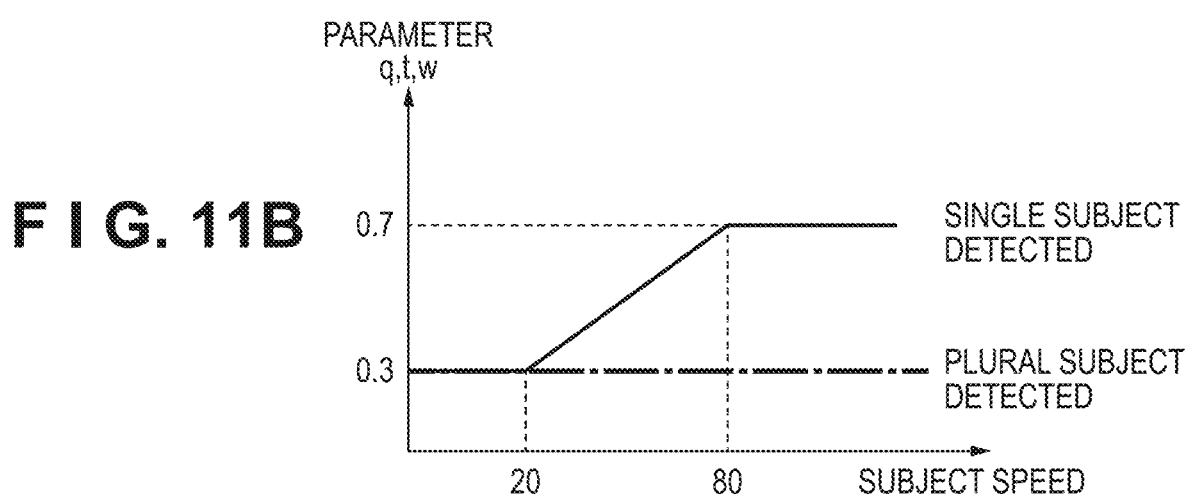
Figure 11C:
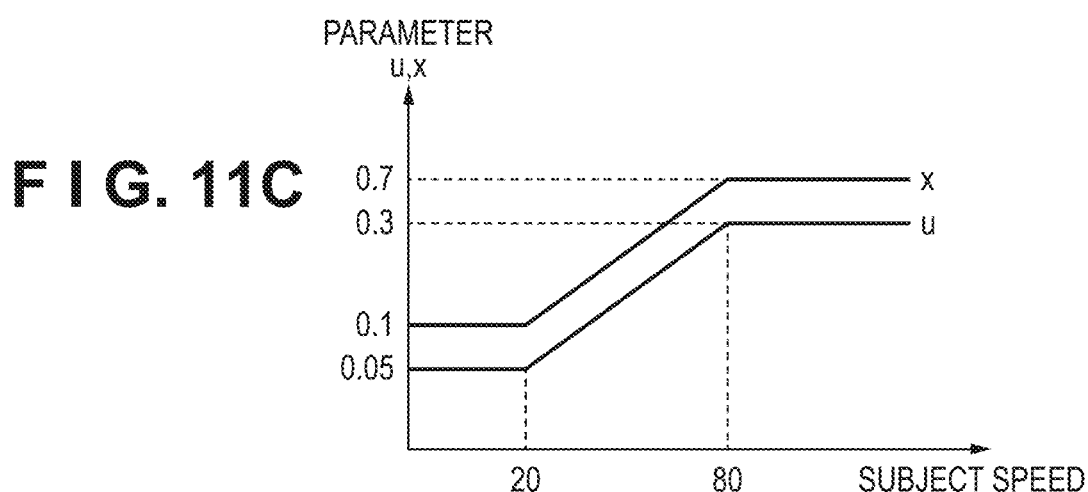
Figure 12A:
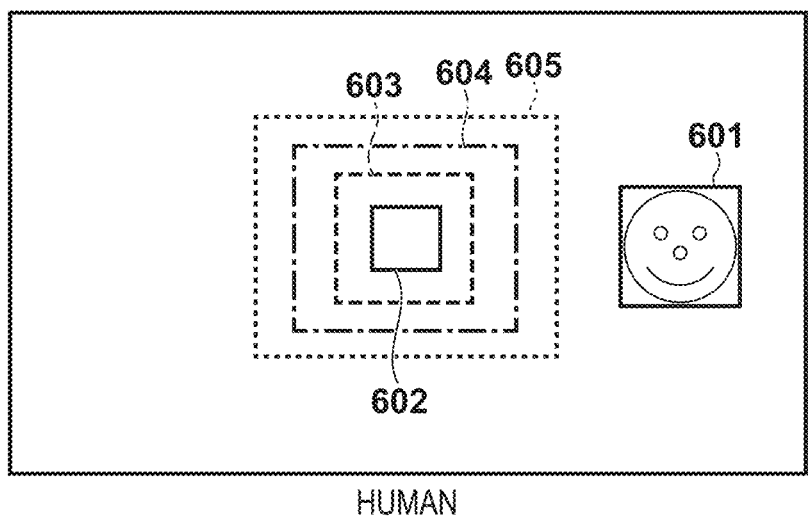
FIGS. 12A-12C are diagrams illustrating examples of changing the enablement determination conditions based on subject types according to the present embodiment.
Figure 12B:
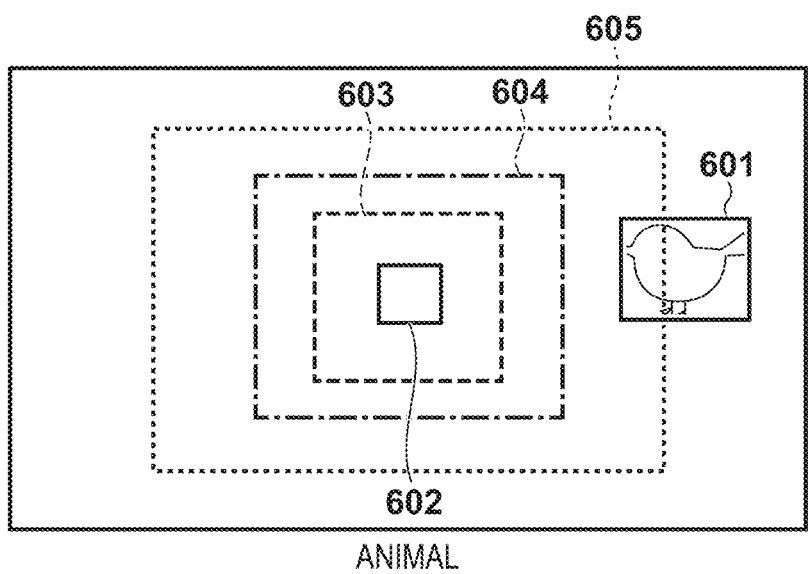
Figure 12C:
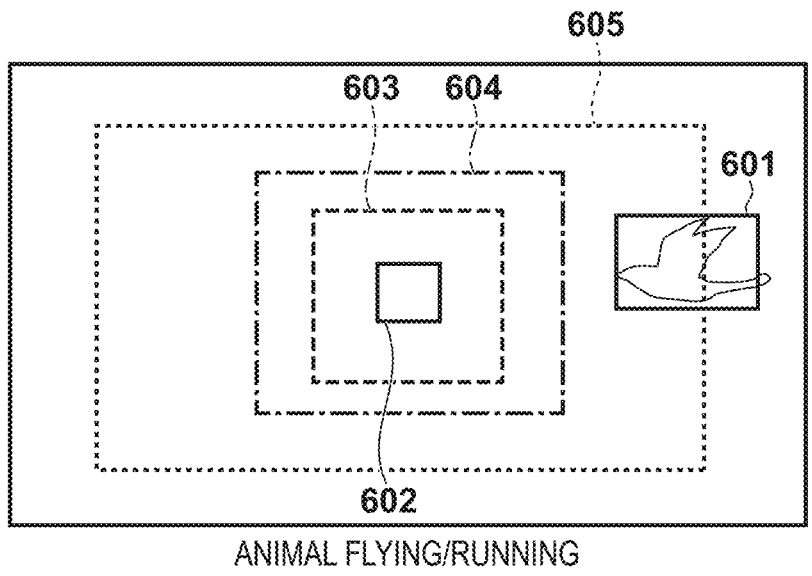
Figure 13A:
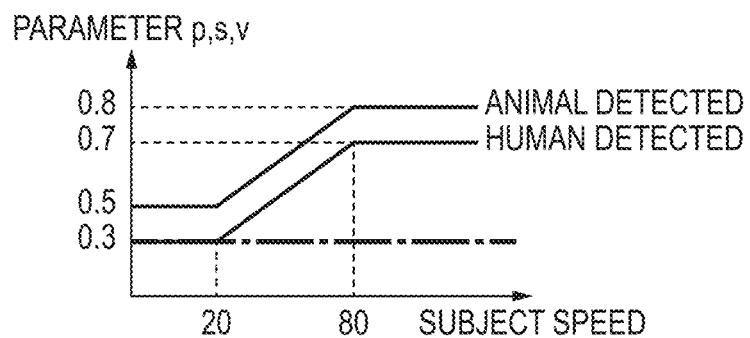
FIGS. 13A-13D are diagrams illustrating examples of relationships between the subject type and the enablement determination condition according to the present embodiment.
Figure 13B:
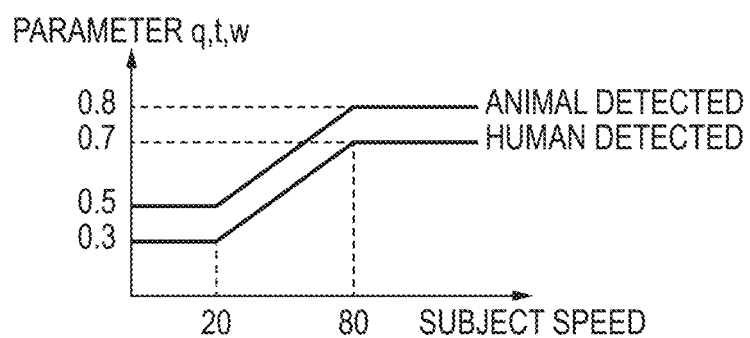
Figure 13C:
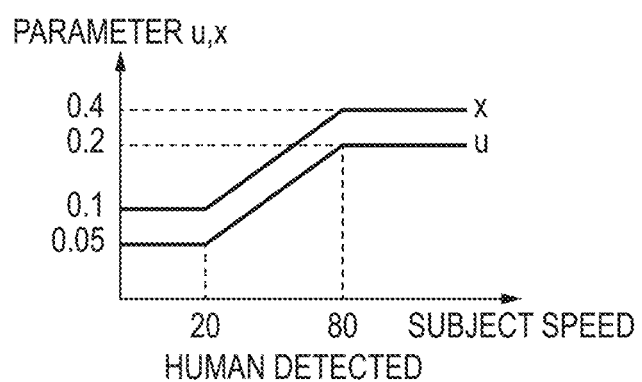
Figure 13D:
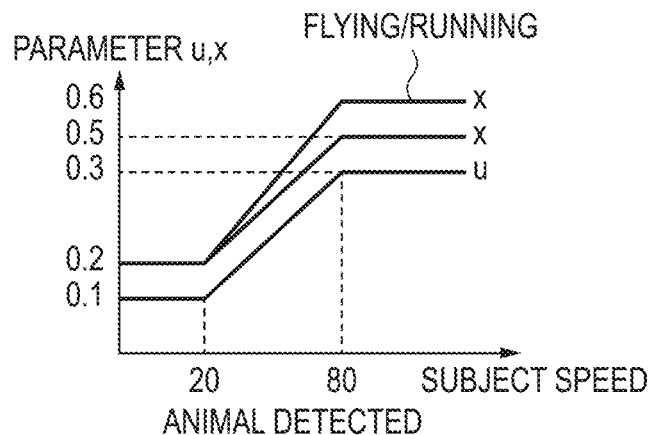

In the above-described enablement determination processing, each of the areas 603 to 605 is set with reference to the size of the preset fixed frame 602, but, for example, in the margin range appropriately set for shooting a stationary subject, when a subject having a dynamic state as shown in FIG. 7 is shot, the subject is easily set to be disabled by moving out of the margin range, and it is likely that the user cannot shoot the subject aimed at by the user as the main subject. In order to address such cases, in the present embodiment, as described below, the parameters of the enablement determination condition are changed in accordance with various situations.

(Condition Change in Accordance with Lens Type)

Since focal lengths of lens—interchangeable cameras and cameras having a zooming function greatly differ from each other, if amounts of camera shake by the user increases in shooting with a high magnification, the subject aimed at by the user is more likely to be disabled. In order to address such cases, as shown in FIGS. 8A-8B and 9A-9C, the parameters of the enablement determination condition of the areas 603 to 605 are set to be larger as the focal length of the lens increases.

The parameters of the enablement determination condition of the areas 603 to 605 may be set to be larger as a degree of correction by an image stabilizer function increases, or the parameters of the enablement determination condition of the areas 603 to 605 may be set to be larger when the image stabilization function is not activated than when the image stabilization function is activated.

(Condition change due to subject movement)

When focusing on the movement of the subject, it is unlikely that the subject aimed at by the user is disabled when the movement of the subject is slow (such as when the subject is walking), but it is likely that the subject aimed at by the user is disabled when the movement of the subject is fast, such as in sports shooting, etc. In order to address such cases, as shown in FIGS. 10A-10C and 11A-11C, the parameters of the enablement determination condition of the areas 603 to 605 are set to be larger as the subject speed (for example, the number of pixels moving between one frame in the VGA image) increases. However, if a plurality of subjects exist in the image, it is likely that the subject other than the desired subject becomes the tracking target; therefore, the enablement determination condition of the area 605 is set to be larger without changing the parameters of the enablement determination conditions of the areas 603 and 604.

(Condition Change in Accordance with Subject Type)

For example, if at least one of a human, an animal and a vehicle is detected as the subject type, the ease with which the user captures the subject varies greatly depending on the subject type. For example, although motions can be predicted to a certain degree as long as the subject is a human or a vehicle, when the subject is an animal or a bird, it is difficult to predict its motion, and it is likely that the subject aimed at by the user is disabled when the subject suddenly starts moving. In order to address such cases, as shown in FIGS. 12A-12C and 13A-13D, the parameters of the enablement determination conditions of the areas 603 to 605 are changed in accordance with the subject type. For example, the parameters of the enablement determination conditions of the areas 603 to 605 are set to be relatively larger when the subject is a dog, a cat, a bird, or the like than those when the subject is a human, a vehicle, or the like. In addition, when it is determined that the subject is flying or running due to the shape of the subject, etc., the parameters of the enablement determination conditions of the areas 603 to 605 are set to be larger.

Furthermore, the parameters of the enablement determination conditions of the areas 603 to 605 may be changed in accordance with a direction in which the subject is moving. For example, the sizes of the areas 603 to 605 may be set to be larger in the direction in which the subject is moving than the direction in which the subject is not moving.

(Condition Change in Accordance with Shooting Mode)

The ease with which the subject is captured differs depending on whether the user shoots a still image or a moving image. Although it is possible to easily set the subject in the vicinity of the fixed frame 602 in still image shooting, there is a case that the shooting is performed by fixing the angle of view in moving image shooting, and since the movement of the subject around the fixed frame 602 increases, it is likely that the subject aimed at by the user is disabled. In order to address such cases, the parameters of the enablement determination conditions of the areas 603 to 605 are set to be larger in moving image shooting than those in still image shooting. For example, the parameters of the enablement determination conditions in the areas 603 to 605 are uniformly set to 1.2 times for moving image shooting with respect to still image shooting.

(Condition Change in Accordance with Fixed Frame Size)

Since the fixed frame 602 of the present embodiment can be changed in position and size, the parameters of the enablement determination conditions of the areas 603 to 605 are also changed in conjunction with the position and size of the fixed frame 602. However, when the positions and sizes of the areas 603 to 605 are at the ends of the angle of view, the upper limit of enlarging the areas 603 to 605 is set to be the ends of the angle of view.

(Condition Change in Accordance with Display/Non-Display of Tracking Frame)

In the present embodiment, it is assumed that the tracking frame 601 is displayed, but the tracking frame 601 may be set to be hidden (i.e., the tracking function is turned off). In a case of setting the tracking frame 601 to be displayed, since the user can easily recognize whether the subject corresponding to the tracking frame 601 or the fixed frame 602 is enabled or disabled as the detection target, the parameters of the enablement determination conditions are set to be larger in the direction of enlarging the areas 603 to 605, but in a case of setting the tracking frame 601 not to be displayed, the parameters of the enablement determination conditions of the areas 603 to 605 are set to be smaller than those in a case of displaying the tracking frame 601 because it is assumed that unnatural feeling is given to the user in shooting depending on the positional relationship between the subject and the fixed frame 602. For example, when the tracking frame is not displayed, the parameters of the enablement determination conditions of the areas 603 to 605 are set to 0.8 times of those in the case of displaying the tracking frame.

In addition to the examples described above, the parameters of the enablement determination conditions of the areas 603 to 605 may be different in accordance with the AF mode (one point AF, area enlarged AF, zone AF, area whole AF, etc.) or the photometric mode (evaluation photometry, average photometry, spot photometry, etc.).

According to the present embodiment, even when the subject (tracking frame) 601 aimed at by the user is outside the range of the fixed frame 602, when the subject aimed by the user is included in the first margin range 603 which is enlarged from the fixed frame 602, the subject aimed at by the user is enabled as the detection target for performing shooting (AF processing and AE processing) and the fixed frame 602 is disabled. Further, when the subject (tracking frame) 601 aimed at by the user goes out of the predetermined second margin range 604 which is larger than the first margin range 603, and does not go out of the third margin range 605 which is larger than the second margin range 604, the enabled state of the subject of the tracking target is continued for the predetermined time period as the detection target for performing shooting (AF processing or AE processing), and then the fixed frame 602 is disabled. Furthermore, when the subject (tracking frame) 601 aimed at by the user goes out of the third margin range 605, the subject 601 aimed at by the user is disabled as the detection target for performing shoot (AF processing or AE processing), and the subject which is enabled as the detection target for performing shooting (AF processing or AE processing) is determined and updated from the subjects inside the margin range 603. As described above, by setting the appropriate margin range in accordance with the function and situation of the subject in shooting, the subject aimed at by the user is not disabled as the detection target for performing shooting (AF processing or AE processing), and the flicker of the exposure can be reduced.

In the present embodiment, an example in which the tracking frame and the fixed frame are simultaneously displayed on the screen for displaying the captured image has been described, but the disclosure is also applicable to cameras having no subject tracking function or cameras capable of turning the tracking function on or off. Although the tracking frame is not displayed for cameras that do not have the subject tracking function or cameras that can turn the tracking function on or off, in this case, it is sufficient to determine whether the subject in the image is enabled or disabled as the detection target.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-028982, filed Feb. 25, 2021 which is hereby incorporated by reference herein in its entirety.

What is claimed is:

1. An apparatus comprising:
a capturing unit configured to capture an image of a subject formed through an optical system and output an image; and
at least one processor and a memory coupled to the processor storing instructions that when executed by the processor, cause the processor to function as:
a photometry unit configured to perform a photometry for a target subject;
a detection unit configured to detect a subject included in the output from the capturing unit;
a setting unit configured to set a degree of weighting for the target subject for which the photometry is performed by the photometry unit; and
a control unit configured to control an exposure based on a photometric result of the photometry unit,
wherein the setting unit sets the weighting of a first subject included in a predetermined first range to be larger than that of other subjects when the detected subject is included in the first range in the image, updates the target subject for the photometry of which the weighting is set to be larger after continuing a state where the weighting of the first subject is set to be larger for a predetermined time when the first subject goes out of a second range which is wider than the first range and when the first subject does not go out of a third range which is wider than the second range, and updates the target subject for the photometry of which the weighting is set to be larger in response to the first subject going out of the third range.

2. The apparatus according to claim 1, wherein
a first frame indicating an area of a subject in the image, and a second frame set in a fixed area in the image can be displayed simultaneously on the image, and
the second frame can be set by a user operation, and the first range, the second range and the third range are areas enlarged by a predetermined magnification with reference to the second frame.

3. The apparatus according to claim 2, wherein
the first range, the second range and the third range are different in size between a case where the first frame is displayed and a case where the first frame is not displayed.

4. The apparatus according to claim 2, wherein
the first range, the second range and the third range are different in size between a case of a still image shooting and a case of a moving image shooting.

5. The apparatus according to claim 1, wherein
the setting unit sets the first range, the second range and the third range to be larger as a degree of correction by a stabilization function increases.

6. The apparatus according to claim 1, wherein
the setting unit sets the first range, the second range and the third range to be larger when a stabilization function is not activated than when the stabilization function is activated.

7. The apparatus according to claim 1, wherein
the setting unit changes sizes of the first range, the second range and the third range in accordance with a type of the subject to be detected by the detection unit.

8. The apparatus according to claim 7, wherein
the detection unit detects at least one of a human, an animal and a vehicle as the type of the subject.

9. The apparatus according to claim 1, wherein
the first range, the second range and the third range can be changed in accordance with a movement of the subject, and
the setting unit sets the first range, the second range and the third range to be larger when the subject is moving than when the subject is in stationary.

10. The apparatus according to claim 1, wherein
the first range, the second range and the third range can be changed in accordance with a direction in which the subject is moving, and
the setting unit sets the first range, the second range and the third range to be larger in the direction in which the subject is moving than a direction in which the subject is not moving.

11. The apparatus according to claim 1, wherein
the setting unit sets the first range, the second range and the third range to be larger as a focal length of a lens included in the optical system increases.

12. A method of controlling an apparatus comprising:
capturing an image of a subject formed through an optical system and outputting an image;
detecting a subject included in the image;
setting a degree of weighting for a target subject for a photometry;
performing the photometry for the target subject; and
controlling an exposure based on a photometric result of the photometry, wherein in the setting, when the detected subject is included in a predetermined first range in the image, the weighting of a first subject included in the first range is set to be larger than that of other subjects, when the first subject goes out of a second range which is wider than the first range and when the first subject does not go out of a third range which is wider than the second range, the target subject for the photometry for which the weighting is set to be larger is updated after continuing a state in which the weighting of the first subject is set to be larger for a predetermined time, and the target subject for which the weighting is set to be larger is updated in response to the first subject going out of the third range.

13. The method according to claim 12, wherein
a first frame indicating an area of a subject in the image, and a second frame set in a fixed area in the image can be displayed simultaneously on the image, and
the second frame can be set by a user operation, and the first range, the second range and the third range are areas enlarged by a predetermined magnification with reference to the second frame.

14. The method according to claim 12, wherein
the setting sets the first range, the second range and the third range to be larger as a degree of correction by a stabilization function increases.

15. The method according to claim 12, wherein
the setting sets the first range, the second range and the third range to be larger when a stabilization function is not activated than when the stabilization function is activated.

16. A non-transitory computer-readable storage medium storing a program that causes a computer to execute a method of controlling an apparatus comprising:
capturing an image of a subject formed through an optical system and outputting an image;
detecting a subject included in the image;
setting a degree of weighting for a target subject for a photometry;
performing the photometry for the target subject; and
controlling an exposure based on a photometric result of the photometry, wherein in the setting, when the detected subject is included in a predetermined first range in the image, the weighting of a first subject included in the first range is set to be larger than that of other subjects, when the first subject goes out of a second range which is wider than the first range and when the first subject does not go out of a third range which is wider than the second range, the target subject for the photometry for which the weighting is set to be larger is updated after continuing a state in which the weighting of the first subject is set to be larger for a predetermined time, and the target subject for which the weighting is set to be larger is updated in response to the first subject going out of the third range.

17. The non-transitory computer-readable storage medium according to claim 16, wherein
a first frame indicating an area of a subject in the image, and a second frame set in a fixed area in the image can be displayed simultaneously on the image, and
the second frame can be set by a user operation, and the first range, the second range and the third range are areas enlarged by a predetermined magnification with reference to the second frame.

18. The non-transitory computer-readable storage medium according to claim 16, wherein
the setting sets the first range, the second range and the third range to be larger as a degree of correction by a stabilization function increases.

19. The non-transitory computer-readable storage medium according to claim 16, wherein
the setting sets the first range, the second range and the third range to be larger when a stabilization function is not activated than when the stabilization function is activated.

* * * * *